(12) United States Patent
Vignotto et al.

(10) Patent No.: US 7,137,740 B2
(45) Date of Patent: Nov. 21, 2006

(54) SENSOR-HOLDING LID FOR A WHEEL HUB BEARING

(75) Inventors: Angelo Vignotto, Turin (IT); Massimo Marivo, Airasca (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 10/336,082

(22) Filed: Jan. 3, 2003

(65) Prior Publication Data
US 2003/0132662 A1    Jul. 17, 2003

(30) Foreign Application Priority Data
Jan. 15, 2002    (IT) .......................... TO2002A0042

(51) Int. Cl.
*F16C 32/00* (2006.01)
(52) U.S. Cl. ..................................... 384/448
(58) Field of Classification Search .. 301/108.1–108.5, 301/105.1; 384/189, 190.6, 190.7, 448, 449
See application file for complete search history.

(56) References Cited

U.S. PATENT DOCUMENTS

| | | | | |
|---|---|---|---|---|
| 3,114,579 A | * | 12/1963 | Isenbarger | 301/108.2 |
| 5,762,425 A | * | 6/1998 | Ouchi | 384/448 |
| 5,814,984 A | * | 9/1998 | Ohmi et al. | 384/448 |
| 5,921,556 A | * | 7/1999 | Bauman et al. | 277/560 |
| 5,967,669 A | * | 10/1999 | Ouchi | 384/448 |
| 6,127,819 A | * | 10/2000 | Ouchi | 384/448 |
| 6,179,297 B1 | * | 1/2001 | Bauman et al. | 277/437 |
| 6,218,827 B1 | * | 4/2001 | Ohmi et al. | 384/448 |
| 6,341,983 B1 | * | 1/2002 | Crawford et al. | 439/587 |
| 6,570,375 B1 | * | 5/2003 | Stroeters et al. | 384/448 |
| 2004/0150392 A1 | * | 8/2004 | Nakano et al. | 324/207.2 |

* cited by examiner

*Primary Examiner*—Jason R. Bellinger
(74) *Attorney, Agent, or Firm*—Merchant & Gould P.C.

(57) ABSTRACT

Sensor-holding lid for a wheel hub bearing, the lid presenting a base wall which is externally delimited by a peripheral border, an axial ledge which is integral to the wall and which is provided with a passing hold for housing the sensor, and a cylindrical wall which is transverse to the base wall and which is arranged radially inside the peripheral wall in order to be fixed onto an external border of the bearing; at least two annular static sealing elements which are made of rubber and which are co-molded, respectively, into the peripheral border on the outside of the cylindrical wall and inside an entry border of the passing hole.

4 Claims, 3 Drawing Sheets

SENSOR-HOLDING LID FOR A WHEEL HUB BEARING

CROSS-REFERENCE TO RELATED APPLICATIONS

This application claims priority to Italian patent number 2002A000042.

FIELD OF INVENTION

The present invention refers to a sensor-holding lid for a wheel hub bearing.

BACKGROUND

In general, sensor-holding lids of a well-known type comprise a base wall which is externally delimited by a circular border, an axial ledge which is integral to the wall and which is provided with a passing hole for housing the sensor, and a cylindrical wall which is provided with a passing hole for housing he sensor, and a cylindrical wall which is transverse to the base wall and which is arranged radially inside the circular border in order to be fixed onto an annular border to the rolling race outside the bearing.

Due to the extremely poor environmental conditions in which the bearing has to operate and which result in the infiltration of liquid via the hole for the sensor into the inside of the bearing itself, the latter is further provided with a waterproof sealing shield which is arrange din a position substantially facing the lid, which is, in turn, provided with one or two passing draining channels which are obtained in proximity to the circular border in order to stop any liquid stagnating between the shield and the lid themselves.

The waterproof shield is, obviously, an additional element which increases the production costs of he wheel bearing, as well as increasing the axial dimensions, and, furthermore, does not completely protect the bearing from any eventual breakage caused by the liquid which, despite the presence of the draining channels, can still stagnate and freeze at low temperatures.

BRIEF SUMMARY

The aim of the present invention is to produce a sensor-holding lid for a wheel hub bearing, which will permit the disadvantages described above to be overcome in a simple cost-effective manner.

According to the present invention, a sensor-holding lid for a wheel hub bearing will be produced, the lid comprising a base wall which is externally delimited by a peripheral border, an axial ledge which is integral to the wall and which is provided with a passing hole in order to house a sensor, and a cylindrical wall which is transverse to the base wall and which is arranged radially inside the peripheral wall in order to be fixed onto an external border (6) of the wheel hub bearing; the lid being characterized by the fact that it comprises a first annular static sealing element which is made of rubber and which is co-molded into the peripheral border on the outside of the cylindrical wall, and a second annular static sealing element which is made of rubber and which is co-molded inside an entry border of the said passing hole.

DETAILED DESCRIPTION

Figure 1:
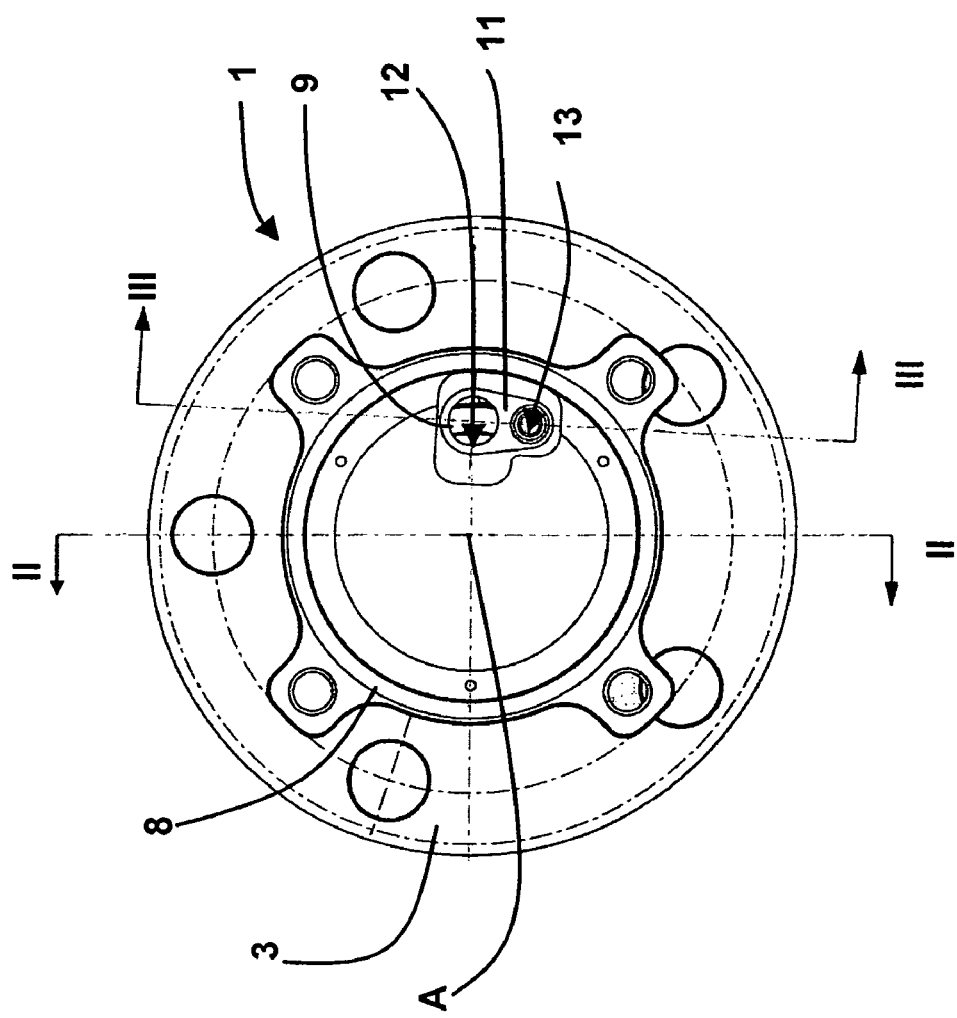
FIG. 1 is an elevated frontal view, on a reduced scale, of a preferred form of embodiment of a sensor-holding lid for a wheel hub bearing produced according to the present invention.
Figure 2:
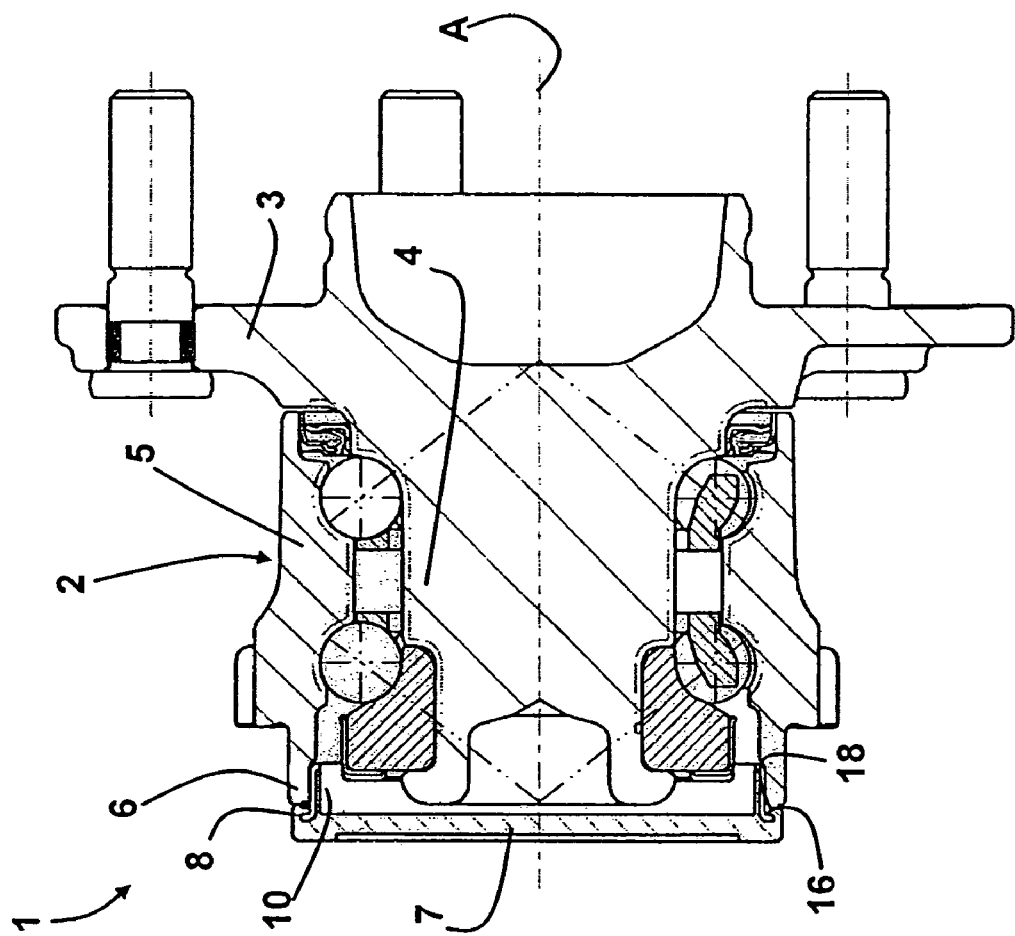
FIGS. 2 and 3 are sections along the lines II—II and III—III respectively of FIG. 1.

The invention will now be described with reference to the attached drawings, which illustrate a non-limiting form of embodiment of the present invention. With reference to FIGS. 1 and 2, the number 1 refers to a sensor-holding lid, in its entirety, for a bearing 2 of a wheel hub 3.

The bearing 2 comprises an inner race 4 which turns around a rotation axis A and which is an integral part of the wheel hub 3, and a fixed outer race 5, which is co-axial to the inner race 4, and which is provided with an annular border 6.

The lid 1 is mounted onto the outer race 5, and it comprises a base wall 7, which is arranged transverse to the A axis, and which is externally delimited by an annular peripheral border 8 which is arranged directly facing the border 6. The lid 1 also comprises a seat 9 which is integral to the base wall 7 for housing a sensor (taken note of, but not illustrated) and a cylindrical wall 10, which is transverse to the wall 7, and which is arranged radially inside the peripheral border 8 in order to be fixed inside the border 6 of the outer race 5.

Figure 3:
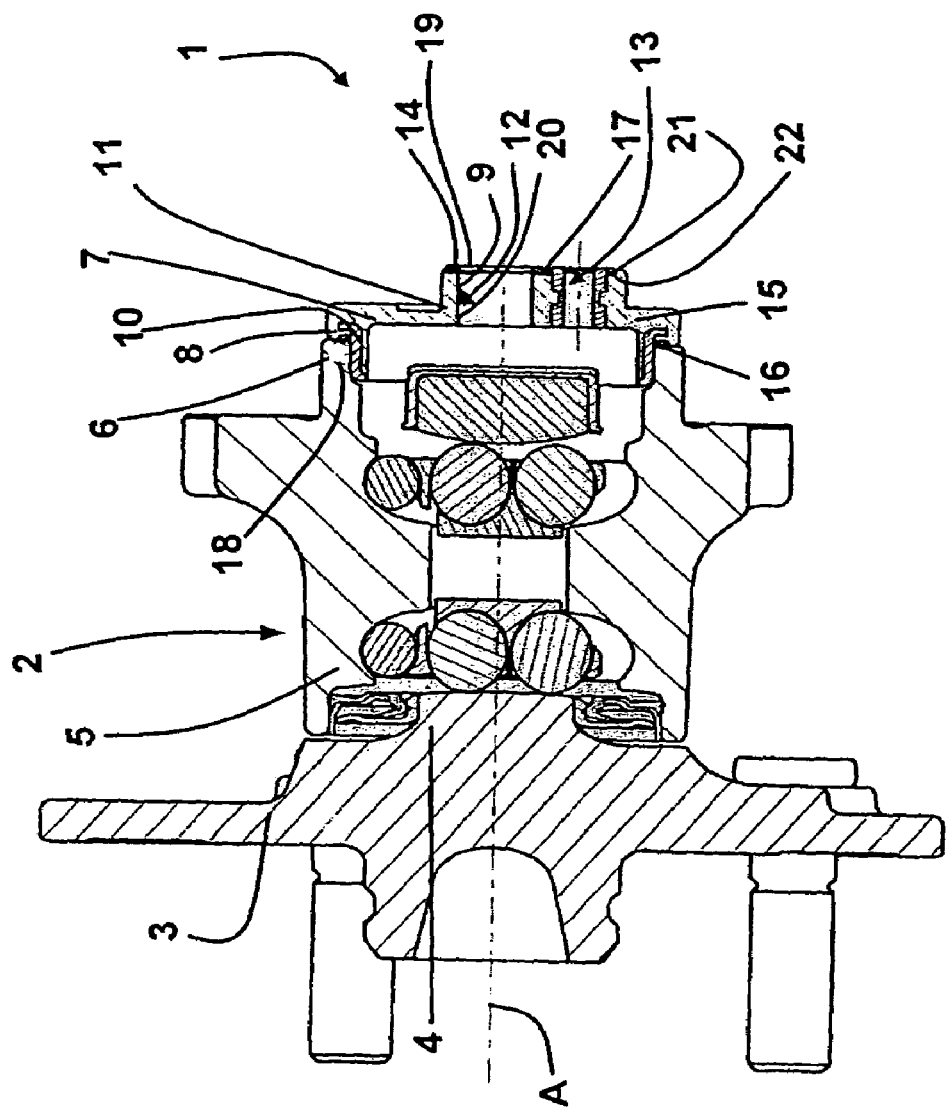

According to the illustration shown in FIG. 3, the lid 1 also comprises an axial ledge 11, which extends axially from the wall 7 towards the outside of the bearing 2, and it is provided with two passing holes 12 and 13, the first of which is delimited towards the outside by an entry border 14 and defines the seat 9, while the second is internally provided with a threaded bushing 15 which is buried inside the ledge 11 during the production of the lid 1.

Finally, the lid 1 comprises a first annular static sealing element 16 which is made of rubber and which is co-molded into the border 8 outside the cylindrical wall 10, and a second annular static sealing element 17 which is made of rubber and which is co-molded inside the entry border 14.

The annular element 16 overlaps axially in relation to an internal axial surface 18 of the border 8, and it is axially compressed between the border 8 itself and the border 6, while the annular element 17 overlaps both axially in relation to an external axial surface 19 of the ledge 11 in order to be axially compressed between the border 6 itself and the above-mentioned sensor, and radially in relation to an internal cylindrical surface 20 of the hole 12 in order to also be radially compressed by the above-mentioned sensor.

The hole 13 defines a fixing seat for the above-mentioned sensor, and it is provided with a third annular static sealing element 21 which is arranged in correspondence with an entry border 22 of the bushing 15. The annular element 21 is suitable for being compressed against the border 22 of a fixing screw (taken note of, but not illustrated) of the above-mentioned sensor which is screwed inside the bushing 15 in order to block the sensor itself onto the lid 1.

The presence of the three annular static sealing elements 16, 17 and 21 defines a continuous barrier between the outside and the inside of the bearing 2 and prevents any infiltration of liquid into the inside of the bearing 2 itself, especially as regards the space immediately inside the lid 1 itself, thus protecting the functional characteristics of the bearing 2, and also permitting the elimination of the waterproofed shield which was referred to previously in the above description.

It is intended that the present invention should not be limited to the form of embodiment which is herein described and illustrated, which is to be considered as an example of a form of embodiment for a sensor-holding lid for a wheel hub bearing, and which may be subject to further modifications in terms of the shape and disposition of its parts, and details pertaining to its construction and assembly.

We claim:

1. A sensor-holding lid for a wheel hub bearing, the lid comprising a base wall which is externally delimited by a peripheral border, an axial ledge which is integral to the wall and which is provided with a passing hole in order to house a sensor, and a cylindrical wall which is transverse to the base wall and which is arranged radially inside the peripheral wall in order to be fixed onto an external border of the wheel hub bearing; the lid having a first annular static sealing element which is made of rubber and which is co-molded radially outward from the cylindrical wall and into the peripheral border, and a second annular static sealing element which is made of rubber and which is co-molded inside an entry border of the said passing hole, wherein the first annular static sealing element overlaps axially in relation to an internal axial surface of the peripheral border, and is suitable for being axially compressed between the peripheral border and the external border of the bearing.

2. The sensor-holding lid according to claim 1, wherein the second annular static sealing element overlaps axially in relation to an external axial surface of the entry border, and is suitable for being compressed between the entry border itself and the said sensor.

3. The sensor-holding lid according to claim 2, wherein the second annular static sealing element overlaps radially in relation to an internal cylindrical surface of the entry border, and is suitable for being radially compressed by the said sensor.

4. The sensor-holding lid according to claim 1, further comprising a fixing housing for the sensor which is provided with an internal bushing and a third annular static sealing element which is arranged in correspondence with an entry border of the bushing itself.

* * * * *